Sept. 13, 1960
GEORGETTE NICOT
NÉE VOILLOT
AUTOMATIC CLUTCH
2,952,345
Filed July 29, 1957
2 Sheets-Sheet 2
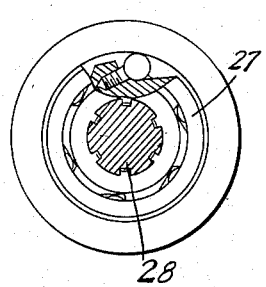
Fig. 4a.
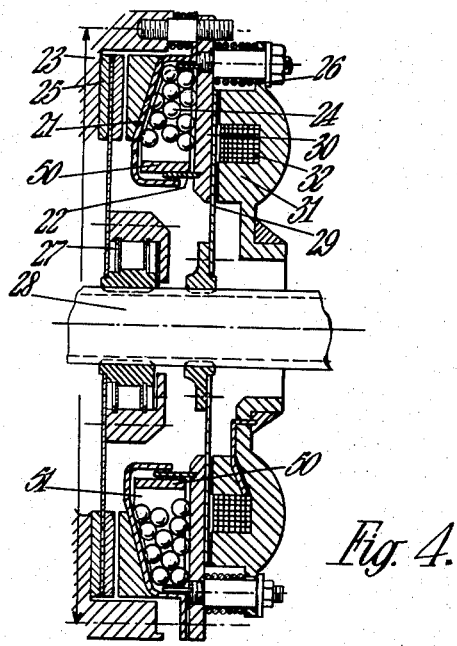
Fig. 4.
Fig. 6.
Fig. 7.
Inventor
Georgette Nicot née Voillot
By Hancock Downing Seebold
Attys.

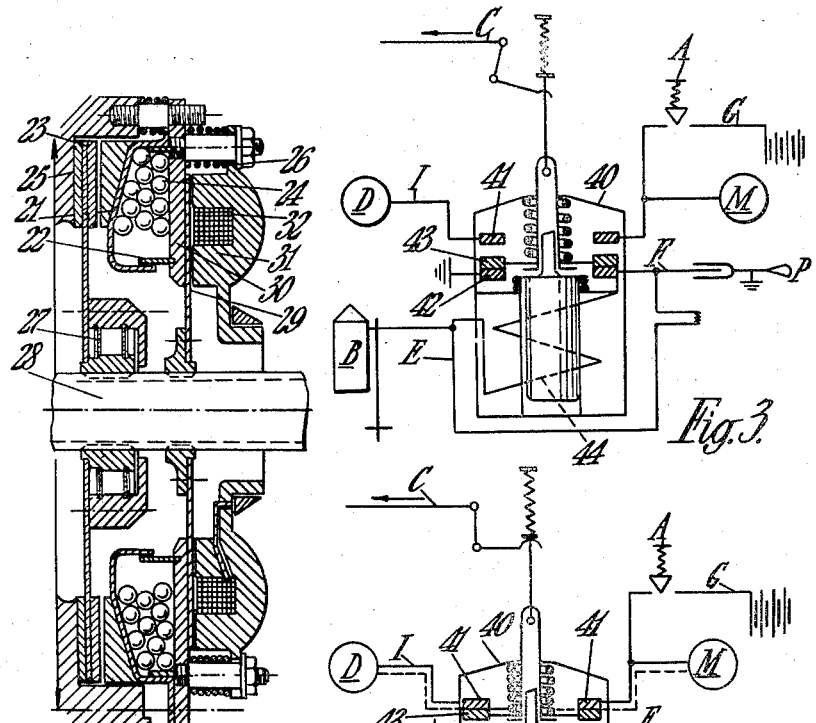

United States Patent Office 2,952,345
Patented Sept. 13, 1960

2,952,345
AUTOMATIC CLUTCH

Georgette Nicot, née Voillot, Paris, France, assignor to Heiman Padova, London, England
Filed July 29, 1957, Ser. No. 674,720
Claims priority, application France Oct. 30, 1956
1 Claim. (Cl. 192—.052)

It is well known that in the classic type of clutch the coupling of the engine to the transmission is effected by the jamming of a so-called friction plate which is integral with the gearbox and held in place under the constant pressure of springs which have to be sufficiently powerful to prevent slipping no matter what the load or engine speed.

De-clutching is effected by cancelling out the pressure of these springs, by operating the clutch pedal. The friction plate being thus released, the link-up between the engine and transmission is destroyed and it is possible to operate the gearbox.

The present invention consists of an automatic clutch made up of at least two groups of clutching and de-clutching mechanisms, one being centrifugal and having a free-wheel clutch plate, the other being by magnetic lock and having a clutch plate which is secured to turn with the driven shaft, the two groups functioning simultaneously or independently in a manner permitting all the manoeuvres involved in starting and driving the vehicle to be effected and at the same time providing braking by the engine.

According to one method of execution of the invention, the centrifugal clutch mechanism comprises two cups mounted in such a manner that they slide one inside the other and are able to come apart under the action of the centrifugal force exerted by the liquid or solid material they contain.

The invention also concerns a manner of execution according to the previous paragraph in which the centrifugal clutch of the type comprising cups mounted so as to be able to slide one inside the other has a loose member dividing the space into compartments fitted between the cups thus separating the material contained in the cups and preventing the clutch being thrown out of equilibrium.

The invention also concerns an automatic clutch characterised in that the magnetically operated clutch engagement takes place with a certain time lag after starting the vehicle by the centrifugal clutch, in a manner giving a progressive clutch engagement thereby making for correct starting.

According to another manner of executing the invention, the magnetic clutch control is operated from the vehicle's accelerator pedal, the said pedal—after the centrifugal clutch has been brought into operation—controlling a contactor which closes a circuit connecting the dynamo to the exciter coil of the magnetic clutch mechanism.

The invention extends also to the characteristics described hereinafter and to the many combinations of which they are possible.

The invention will be further described with reference to the accompanying drawings which are presented merely by way of example and do not imply that the scope of the invention be thus limited:

Figure 1 is an axial section of an embodiment;
Figures 2 and 3 are diagrammatic views of the magnetic clutch control engaged and disengaged respectively;
Figure 4 is a modification of Figure 1 showing a loose partition member in position;
Fig. 4a is a view from the left of the free wheel of Fig. 4 in partial section and with the associated clutch plate removed.

Figure 5 is a perspective view of the loose partition member;
Figures 6 and 7 are side and end sections of the loose partition member in position between the cups.

In the type of execution represented in Figure 1, the centrifugal system is constituted by two cups 21 and 22 integral with driving flywheel 23 and fitting one inside the other like a box and its lid and containing steel balls 24.

As balls 24 are driven into a narrow corner by the centrifugal force they push the cups apart with a force which is proportionate to the rotational speed. The result of this is that the force jamming friction plate 25 against flywheel 23 increases in proportion to the speed of the engine.

When the engine drops back into its normal idling speed, cups 21 and 22 are brought back to their initial position by springs 26 and de-clutching again takes place.

Thus, clutching and de-clutching take place automatically when starting and stopping.

All that remains now is to find a way of de-clutching when the vehicle is running so as to enable gear changes to be made.

It is obvious that, in the conditions described above, it is not possible to rely on the centrifugal system for freeing friction plate 25, and so it has been found necessary to fit a free wheel 27 between shanked pinion 28 and friction plate 25.

As soon as the driver takes his foot off the accelerator (even slightly), shanked pinion 28 is freed and gear changes can be effected without shock.

It is however necessary to limit the effect of free wheel 27 to the actual time that the gear is changed and no longer. In order to do this, a second plate 29 of soft steel very permeable to the magnetic flux but not remanent (or of anti-magnetic steel even), has been fitted, positioned in the gap between the fixed plate 31 and the movable plate 30, plate 31 has a magnetic ring winding 32 which the passage of current causes to be locked solid with the plate 30 thus blocking the effect of free wheel 27 and so preserving in the vehicle the engine braking force.

This appliance also provides a possibility for starting the engine by pushing the vehicle. All that is required is to close the magnetic circuit by the battery, the plate's adherence being sufficient to turn the engine.

A spring-loaded switch, in the form of a button fitted on the dashboard, enables this manoeuvre to be carried out.

It should be noted that the pressure of magnetic ring 32 on the steel plate 29 does not have to be very considerable since all that is necessary is to counter the engine's deceleration, the torque resulting from the action of the engine being absorbed by free wheel 27. It should also be noted that this pressure supplements that of the centrifugal system and increases the effect of same.

It is impossible for clutch slipping to occur, even below the speed necessary for the centrifugal clutch engagement to operate, the magnetic system offering sufficient resistance to drive the whole assembly.

Because the current is taken from the dynamo, the magnetic circuit is not fed with energy when the vehicle is stationary. Then, only the centrifuge is functioning with the progressiveness and smooth action which are characteristic of it.

In short, the advantages offered by the invention are numerous:

Its mechanical and electrical design is simple and within the capability of any engineer;

The smoothness and progressiveness of engagement, thanks to the centrifugal system;

Friction plate 25 cannot slip because its grip increases proportionately with the speed of the engine.

When changing gear the engine pick-up is smoother since, the clutch plate not having been released, no slipping takes place. These are all undeniable advantages in competitive motoring.

Friction plate 25 is subjected to practically no wear because it is actually blocked when the car is being driven and it is only used for manoeuvring and starting, free wheel 27 functioning all on its own for gear-ratio changes.

While driving, braking or stopping the vehicle it is unnecessary to return to neutral because whatever the position of the gear lever it is impossible for the engine to stall, for, as soon as idling speed has been reached, the centrifuge releases friction plate 25 and the electro-magnetic system releases metal plate 29 since the dynamo is no longer delivering current.

Conversely, it is impossible to race the engine under any running conditions if a false move is made.

There is no wear on steel plate 29 since there is never any friction on air gaps 30 and 31.

It is possible to start the engine by pushing the car, momentarily feeding the electrical circuit from the battery.

The vehicle can be driven in top gear at an extremely slow pace thanks to the electro-magnetic lock whereas the centrifugal system alone would not allow this.

In this invention the primary plate drive system can be driven by any means, centrifugal of whatever type, or springs, but it is always reinforced by the second plate integral with the shaft which is jammed by an electro-magnetic system.

According to another variant of the invention, the magnetic clutch drive takes place with a certain time lag after starting the engine.

To achieve this, the excitation of the coils on the electro-magnetic clutch is arranged to take place at a certain tension which the dynamo only reaches at a certain running speed which is in fact higher than engine idling speed.

As can be seen in Figures 2 and 3, in the electrical circuit I leading from dynamo "D" to clutch "M" is mounted a contactor 40. This contactor has two sets of contacts 41 and 42. Contacts 41 close the circuit dynamo D-clutch M. Movable armature 43 of contact 40 is actuated by accelerator pedal C.

On its other side, contactor 40 has a winding 44 producing an attracting force opposing that developed by linkage C of the accelerator. This coil's electrical circuit is closed by a contact fitted on gear lever P.

Finally, a locking contact A completes the installation in such a manner as to close electrical circuits G if the vehicle is being pushed to start the engine.

The appliance described above functions in the following manner:

When the vehicle engine is started up the centrifugal clutch starts to operate, but the electro-magnetic one is not yet working.

As soon as the driver presses the accelerator, he closes contact 41 of contactor 40 by way of linkage C. The tension produced by the dynamo is then sufficient to attract the armature of the electro-magnetic clutch.

When the driver wishes to change gear, he must disengage the magnetic clutch to enable him to operate his gear change.

To do this, the electrical contact of gear lever P closes when a force is exerted on same, the effect of this being that coil 44 is excited by an electrical circuit E—F. Coil 44 then attracts contact 43 cutting off the flow of current from the dynamo D to the magnetic clutch M, and, the clutch being out, the driver is able to change gear.

Contact 41 will remain open for as long as coil 44 stays excited. In turn, coil 44 will remain excited even if the driver ceases to exert pressure on gear lever P, the coil's electrical circuit closing by contacts 42.

In order to re-excite the electro-magnetic clutch, the driver has to press once again on the accelerator pedal so as to make movable contact 43 close contact 41 by way of linkage C, as has already been seen. This contactor is adjusted so as to close this circuit only when the vehicle's centrifugal clutch mechanism is completely engaged.

The invention also concerns a particular arrangement of the centrifugal clutch mechanism shown in Figs. 4 to 6 inclusive.

In the space provided between the two cups 21 and 22, a movable division into compartments is fitted. This is made up of a ring 50, on the outer surface of which are fitted, perpendicularly, vanes or fins 51.

In the example which is being quoted, there are eight vanes each standing perpendicular in relation to the others. Thus, balls 24 which are enclosed in the cups are uniformly distributed in the eight compartments 52 formed by the vanes.

The movable assembly of compartments is driven at the same speed as the balls so as to synchronize the rotations.

This arrangement also brings the clutch mechanism into equilibrium since the balls moving inside their compartments are unable to become displaced all on one side under the action of the centrifugal force, being confined as they are, in their respective compartments.

It is quite obvious that the invention is not limited in scope to the examples of execution as described and illustrated above, and that, starting with these examples, other variants may be evolved without departing from the framework of the invention.

An automatic clutch arrangement for a motor vehicle comprising a vehicle gear-change lever, a clutch driving member, a clutch member to be driven, a free-wheel device mounted on the driven member, a clutch plate mounted on the free-wheel device to drive the member to be driven thereover but to allow the member to be driven to overrun, a centrifugally operable clutch member mounted on the driving member to operate under centrifugal force to engage the clutch plate with the driving member when the speed of rotation of the driving member rises above a predetermined value and to release the clutch plate from the driving member when the speed of rotation of the driving member falls below a predetermined value, a second clutch plate secured on the member to be driven, to turn therewith, a second clutch member mounted on the driving member for engaging the second clutch plate therewith when operated, the second clutch member and second clutch plate forming an electro-magnetic clutch, means for energizing the electro-magnetic clutch, a vehicle accelerator pedal, a vehicle gear-change lever and control means operated by the pedal to connect the energizing means to the electro-magnetic clutch for the purpose of energizing it and operated by operation of the vehicle gear-change lever to disconnect the energizing means from the electro-magnetic clutch during gear change.

References Cited in the file of this patent

UNITED STATES PATENTS

| | | |
|---|---|---|
| 1,975,185 | Wemp | Oct. 2, 1934 |
| 2,109,420 | Guernsey | Feb. 22, 1938 |
| 2,136,811 | Burtnett | Nov. 15, 1938 |
| 2,447,007 | Gravina | Aug. 17, 1948 |
| 2,720,295 | Bradbury | Oct. 11, 1955 |
| 2,774,452 | Wisman | Dec. 18, 1956 |
| 2,850,131 | Maurice et al. | Sept. 2, 1958 |

FOREIGN PATENTS

| | | |
|---|---|---|
| 326,921 | Great Britain | Mar. 27, 1930 |